United States Patent
Shin (10) Patent No.: US 12,549,349 B2
(45) Date of Patent: Feb. 10, 2026

(54) METHOD OF CALCULATING CIPHER AND ELECTRONIC DEVICE PERFORMING THE METHOD

(71) Applicant: ICTK CO., LTD., Seongnam-si (KR)

(72) Inventor: Kwang Cho Shin, Seoul (KR)

(73) Assignee: ICTK CO., LTD., Seongnam-si (KR)

( * ) Notice: Subject to any disclaimer, the term of this patent is extended or adjusted under 35 U.S.C. 154(b) by 199 days.

(21) Appl. No.: 18/467,821

(22) Filed: Sep. 15, 2023

(65) Prior Publication Data

US 2024/0106639 A1 Mar. 28, 2024

(30) Foreign Application Priority Data

Sep. 21, 2022 (KR) ........................ 10-2022-0119432

(51) Int. Cl.
*H04L 9/08* (2006.01)
*H04L 9/32* (2006.01)

(52) U.S. Cl.
CPC .......... *H04L 9/0869* (2013.01); *H04L 9/3278* (2013.01)

(58) Field of Classification Search
CPC ..... H04L 9/0869; H04L 9/3278; H04L 9/003; H04L 9/3066; G06F 7/523
See application file for complete search history.

(56) References Cited

U.S. PATENT DOCUMENTS

| | | | |
|---|---|---|---|
| 10,958,424 B1 * | 3/2021 | Chhabra | H04L 9/083 |
| 2012/0207298 A1 | 8/2012 | Meyer | |
| 2015/0280906 A1 * | 10/2015 | Shany | H04L 9/004 380/29 |
| 2016/0072622 A1 | 3/2016 | Al-Somani | |
| 2017/0149572 A1 * | 5/2017 | Wallrabenstein | H03K 19/17748 |
| 2017/0187537 A1 * | 6/2017 | Kim | H04L 9/30 |
| 2018/0316498 A1 * | 11/2018 | Choi | H04L 9/003 |
| 2020/0287712 A1 * | 9/2020 | Macchetti | H04L 9/003 |
| 2021/0409188 A1 | 12/2021 | Ghosh | |
| 2022/0085998 A1 * | 3/2022 | Xiao | G06F 7/728 |
| 2022/0085999 A1 * | 3/2022 | Hamburg | H04L 9/003 |
| 2022/0166614 A1 * | 5/2022 | Tunstall | G06F 7/02 |
| 2022/0166638 A1 * | 5/2022 | Razi | H04L 9/3278 |

OTHER PUBLICATIONS

European Extended Search Report issued in EP23198765, dated Feb. 8, 2024, 9 pages.

* cited by examiner

*Primary Examiner* — Phy Anh T Vu
(74) *Attorney, Agent, or Firm* — Blueshift IP; Robert Plotkin

(57) ABSTRACT

Disclosed are a method of calculating a cipher and an electronic device performing the method. The method of calculating the cipher according to an embodiment of the present invention includes reading predetermined secret information t and a first intermediate result based on the secret information t, generating a random value k, calculating a second intermediate result l using the secret information t and the random value k, and performing scalar point multiplication using the first intermediate result and the second intermediate result, wherein the first intermediate result is determined at a different time point from the calculating of the second intermediate result l and stored in a chip and/or memory included in the electronic device.

17 Claims, 2 Drawing Sheets

METHOD OF CALCULATING CIPHER AND ELECTRONIC DEVICE PERFORMING THE METHOD

CROSS-REFERENCE TO RELATED APPLICATION

This application claims priority to and the benefit of Korean Patent Application No. 10-2022-0119432, filed on Sep. 21, 2022, the disclosure of which is incorporated herein by reference in its entirety.

BACKGROUND

1. Field of the Invention

The present invention relates to a method of calculating a cipher for a defense against a side-channel attack, and an electronic device performing the method.

2. Discussion of Related Art

A side-channel attack is an attack that extracts current usage or electromagnetic (EM) signals from calculations used for secret calculations such as encryption and the like to find secret information necessary for the secret calculations.

As methods of preventing a side-channel attack, methods of using random information for calculations are being used.

SUMMARY OF THE INVENTION

In the case in which random information is used for secret calculations, there is a possibility of extracting secret information using the bias of random information and a new side-channel attack method. For example, in the case in which information is converted into Jacobi coordinates in cryptographic calculations such as elliptic-curve cryptography (ECC) and the like, when random information is input in z coordinates to hide intermediate results of calculations, secret information may be exposed using a side-channel attack method.

The present invention is directed to providing a method of calculating a cipher that can prevent a side-channel attack by storing a value using other internal secret information and performing secret calculations using the value, and an electronic device performing the method.

The present invention is also directed to providing a method of calculating a cipher that can make a value to be known impossible to calculate using a side-channel attack when internal secret information is not known even when the side-channel attack succeeds, and an electronic device performing the method.

According to an aspect of the present invention, there is provided a method of calculating a cipher of an electronic device, which includes reading predetermined secret information t and a first intermediate result based on the secret information t, generating a random value k, calculating a second intermediate result l using the secret information t and the random value k, and performing scalar point multiplication using the first intermediate result and the second intermediate result, wherein the first intermediate result is determined at a different time point from the calculating of the second intermediate result l and stored in a chip and/or memory included in the electronic device.

The first intermediate result may be determined to be $(t^{-1} \times G)$ calculated using a calculation in which the secret information t and the generator G are used.

In the calculating of the second intermediate result l, k·t mod n calculated using the secret information t, the random value k, and an upper order n of an elliptic curve (EC) may be calculated as the second intermediate result l, and the mod may denote modular arithmetic.

In the performing of the scalar point multiplication, $l \times (t^{-1} \times G)$ may be calculated using the second intermediate result l and the first intermediate result $(t^{-1} \times G)$.

The secret information may include a value of a physically unclonable function (PUF) that provides a digital value that is set differently for each device and is unpredictable.

The method of calculating the cipher may further include reading a predetermined private key sk, wherein, in the calculating of the second intermediate result, sk·t mod n calculated using the private key sk, and the secret information t, and the upper order n of the EC may be calculated as the second intermediate result l, in the performing of the scalar point multiplication, $l \times (t^{-1} \times G)$ may be calculated using the first intermediate result $(t^{-1} \times G)$ and the second intermediate result l, and the mod may denote modular arithmetic.

The method of calculating the cipher according to an aspect of the present invention is not limited to an EC and may be applied to a public key infrastructure (PM) cryptographic algorithm based on a general discrete logarithm problem (DLP). The method of calculating the cipher according to an aspect of the present invention is not limited to a Galois field (GF) and may be applied to any cryptographic algorithm using a DLP.

According to another aspect of the present invention, there is provided a method of calculating a cipher, which includes reading predetermined secret information t and a first intermediate result based on the secret information t, generating a random value k, calculating of a second intermediate result l using the secret information t and the random value k, and performing an exponential calculation on a generator g using the first intermediate result and the second intermediate result, wherein the first intermediate result is determined at a different time point from the calculating of the second intermediate result l and stored in a chip and/or memory included in the electronic device.

The first intermediate result may be determined to be $$g^{t^{-1}}$$

calculated using a calculation in which the secret information t and the generator g are used, in the calculating of the second intermediate result l, k·t mod n calculated using the secret information t and the random value k may be calculated as the second intermediate result l, and in the performing of the exponential calculation, $$\left(g^{t^{-1}}\right)^l = g^{t^{-1} \cdot k t} = g^k$$

may be calculated using the first intermediate result and the second intermediate result l.

The method of calculating the cipher may further include reading a predetermined private key sk, wherein, in the calculating of the second intermediate result, sk·t mod n calculated using the private key sk and the secret information t may be calculated as the second intermediate result l, in the performing of the exponential calculation, $$\left(g^{t^{-s}}\right)^l = g^{sk}$$

may be calculated using the first intermediate result and the second intermediate result l, and the mod may denote modular arithmetic.

The first intermediate result may be determined to be $$g^{t^{-1}}$$

mod p calculated using a calculation in which the secret information t, the generator g, and a prime number p are used, in the calculating of the second intermediate result l, k·t mod n calculated using the secret information t and the random value k may be calculated as the second intermediate result l in order to calculate $g^k$ mod p, and in the performing of the exponential calculation, $$g^k \bmod p = \left(g^{t^{-s}}\right)^l \bmod p = \left(g^{t^{-1}}\right)^{k \cdot t} \bmod p$$

may be calculated using the first intermediate result and the second intermediate result l.

According to still another aspect of the present invention, there is provided an electronic device, including a processor and a memory electrically connected to the processor and configured to store instructions executable by the processor, wherein the processor reads predetermined secret information t and a first intermediate result based on the secret information t, generates a random value k, calculates a second intermediate result l using the secret information t and the random value k, and performs an exponential calculation on a generator g using the first intermediate result and the second intermediate result, and the first intermediate result is determined at a different time point from the calculation of the second intermediate result l and stored in a chip and/or memory included in the electronic device.

The first intermediate result may be determined to be $$g^{t^{-1}}$$

calculated using a calculation in which the secret information t and the generator g are used, and the processor may calculate k·t mod n as the second intermediate result l using the secret information t and the random value k in order to calculate $g^k$, and calculate $$g^k = \left(g^{t^{-1}}\right)^l$$

using the first intermediate result and the second intermediate result l.

The processor may read a predetermined private key sk, calculate sk·t mod n using the secret information t as the second intermediate result l in order to calculate pk=$g^{sk}$ for the private key sk, and calculate $$g^{sk} = \left(g^{t^{-1}}\right)^l$$

using the first intermediate result and the second intermediate result l, and the mod may denote modular arithmetic.

The first intermediate result may be determined to be $$g^{t^{-1}}$$

mod p calculated using a calculation in which the secret information t, the generator g, and a prime number p are used, and the processor may calculate k·t mod n as the second intermediate result l using the secret information t and the random value k in order to calculate $g^k$ mod p, and calculate $$g^k \bmod p = \left(g^{t^{-1}}\right)^l \bmod p = \left(g^{t^{-1}}\right)^{k \cdot t} \bmod p$$

using the first intermediate result and the second intermediate result l.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. However, while the embodiments are open to various modifications, the scope of the patent invention is not restricted or limited by these embodiments. It should be understood that the present invention is to cover all modifications, equivalents, and alternatives falling within the spirit and scope of the present invention.

The terms used herein are for the purpose of describing the embodiments only and are not intended to be limiting to the present invention. As used herein, the singular forms "a" and "an" are intended to include the plural forms as well, unless the context clearly indicates otherwise. It will be further understood that the terms "comprise," "comprising," "include," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, in the description of the embodiments of the present invention with reference to the accompanying drawings, the same components are denoted by the same reference numerals regardless of the drawings, and thus the description thereof will not be repeated. When the embodiments of the present invention are described, if it is determined that detailed descriptions of known technology related to the present invention unnecessarily obscure the subject matter of the embodiments of the present invention, detailed descriptions thereof will be omitted.

Figure 1:
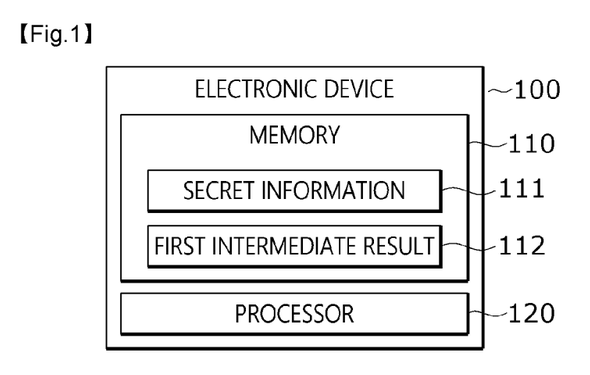
FIG. 1 is a schematic block diagram of an electronic device according to an embodiment.

FIG. 1 is a schematic block diagram of an electronic device 100 according to an embodiment.

Referring to FIG. 1, the electronic device 100 according to the embodiment may include a memory 110 and a processor 120.

The processor 120 may, for example, execute software (e.g., a program) to control at least one other component (e.g., a hardware or software component) of the electronic device 100, which is connected to the processor 120, and may perform various data processing or calculations. According to an embodiment, as at least part of data processing or calculation, the processor 120 may store instructions or data received from other components in a volatile memory, execute or process the instructions or data stored in the volatile memory, and store result data in a non-volatile memory. According to an embodiment, the processor 120 may include a main processor (e.g., a central processing unit or an application processor), or a coprocessor (e.g., a graphics processing unit, a neural processing unit (NPU), an image signal processor, a sensor hub processor, or a communication processor) that may operate independently of or together with the main processor. For example, when the electronic device 100 includes a main processor and a coprocessor, the coprocessor may use less power than the main processor or may be set to be specialized for a designated function. The coprocessor may be implemented separately from the main processor or as a part of the main processor.

The memory 110 may store various types of data used by at least one component of the electronic device 100. The data may include, for example, software and input or output data for instructions associated with the software. The memory 110 may include a volatile memory or a non-volatile memory. As an example, the electronic device 100 may store predetermined secret information 111 in a chip and/or the memory 110. For example, the electronic device 100 may store a first intermediate result 112 based on the secret information 111 in the chip and/or the memory 110.

The electronic device 100 may perform a cryptographic calculation using the secret information 111 and the first intermediate result 112. For example, when the electronic device 100 performs a cryptographic calculation according to an elliptic curve digital signature algorithm (ECDSA) or performs an elliptic-curve cryptography (ECC)-based cryptographic calculation, the electronic device 100 may generate a random value and calculate a second intermediate result using the secret information 111 and the random value. The electronic device 100 may perform scalar point multiplication using the first intermediate result 112 and the second intermediate result. The electronic device 100 may generate a digital signature using points generated by performing scalar point multiplication.

The electronic device 100 may perform a cryptographic calculation using Diffie Hellman (DH) key exchange, a digital signature algorithm (DSA), or the like, which is a public key infrastructure (PM) cryptographic algorithm based on a discrete logarithm problem (DLP). For example, the electronic device 100 may calculate the second intermediate result using the secret information 111 and the random value according to the DSA. The electronic device 100 may perform an exponential calculation on a generator g using the first intermediate result 112 and the second intermediate result. The electronic device 100 may generate a digital signature using a result of the exponential calculation.

For example, the first intermediate result 112 may be determined at a time point different from that of the calculation of the second intermediate result and stored in the chip and/or memory 110 included in the electronic device 100. For example, the first intermediate result 112 may be stored in the chip and/or the memory 110 prior to the time point of the calculation of the second intermediate result.

The electronic device 100 may perform a cryptographic calculation to generate a digital signature. The electronic device 100 may perform a cryptographic calculation using the secret information 111 and the first intermediate result 112 to prevent leakage of the secret information 111 due to a side-channel attack.

For example, the random value can't be known from the first intermediate result 112 or the second intermediate result in the information leaked by the side-channel attack in the case in which the secret information 111 is not known. Since the random value to be known by the side-channel attack is used for obtaining the secret information 111, the random value to be obtained from the information leaked by the side-channel attack cannot be obtained.

Figure 2:
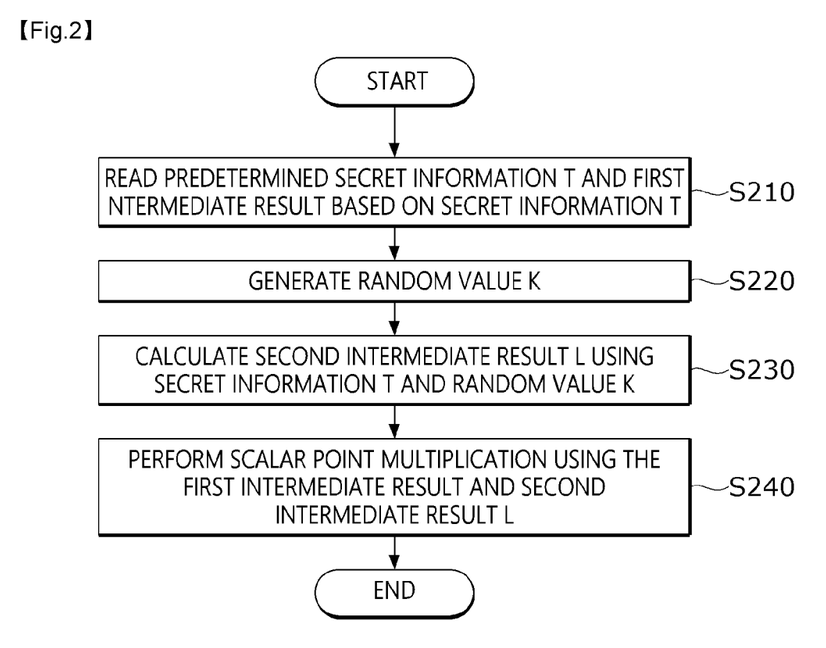
FIG. 2 is an operation flowchart of a method of calculating a cipher according to an embodiment.

FIG. 2 is an operation flowchart of a method of calculating a cipher according to an embodiment.

Referring to FIG. 2, an electronic device 100 according to the embodiment may read predetermined secret information 111 and a first intermediate result 112 based on the secret information 111 in operation S210. For example, the electronic device 100 may read secret information 111 and a first intermediate result 112 stored in a memory 110 and/or a chip.

For example, the electronic device 100 may generate a random value in operation S220. The random value is a value that is not exposed to the outside like the secret information 111, and may be generated whenever a digital signature is generated.

For example, the electronic device 100 may calculate a second intermediate result using the secret information 111 and the random value in operation S230. For example, the electronic device 100 may perform scalar point multiplication using the first intermediate result 112 and the second intermediate result in operation S240.

For example, the electronic device 100 may generate a digital signature using ECC, which is a cryptography method based on elliptic curve theory.

For example, the ECC is a method of calculating a cipher in which, due to an elliptic curve discrete logarithm problem (ECDLP), the fact that scalar point multiplication of an elliptic curve (EC) may be performed rapidly but a reverse calculation is very difficult is used.

For example, the electronic device 100 may perform an ECC-based cryptographic calculation using a determined EC, a generator, a range of a finite field set, and the like. For example, the EC, the generator, the range of the finite field set, and the like may be domain parameters of an EC.

For example, in the case of a prime curve, EC domain parameters may include p, a, b, G, n, and h. For example, in the case of a binary curve, EC domain parameters may include m, f, a, b, G, n, and h.

For example, the parameter p may denote a modulus prime number that determines a size of a finite field set. For example, the parameters a and b may denote a coefficient and a constant in an EC $y^2=x^3+ax+b$, respectively.

For example, the parameter G may denote a generator of the EC. For example, the parameter n is the number of elements of a group that can be generated by the generator G, and may denote an upper order of the generator G. For example, when it is assumed that the total number of points generated through the prime number p modular arithmetic on the EC is denoted by N and the total number of points in a subgroup generated by the generator G is denoted by n, the parameter h may be defined using h=N/n. For example, the parameter h may denote a cofactor.

For example, the electronic device 100 based on ECC may read the secret information 111 ($t$) and the first intermediate result 112 in operation S210. As an example, the first intermediate result 112 may be determined based on a calculation in which the secret information 111 ($t$) and the generator G are used. For example, the first intermediate result 112 may be determined to be ($t^{-1} \times G$).

As an example, the electronic device 100 may perform a cryptographic calculation using an ECDSA. The ECDSA is an algorithm that performs digital signatures using elliptic curve technology. The electronic device 100 may perform DSA signatures or digital signatures according to an ECDSA based on ECC.

For example, in order for the electronic device 100 to perform a cryptographic calculation according to an ECDSA and generate a digital signature, the electronic device 100 may perform scalar point multiplication. For example, the electronic device 100 may generate a random value k and perform scalar point multiplication using the random value k and the generator G. For example, the electronic device 100 may calculate k×G, and generate a digital signature pair (r,s) using points of k×G. For example, the electronic device 100 may calculate the digital signature pair (r,s) using a point ($x_1,y_1$), which is a calculation result of k×G, as shown in Equation 1 below.

$$r = x_1 \bmod n$$

$$s = (k^{-1}(H(m) + r \cdot sk)) \bmod n \quad \text{[Equation 1]}$$

In Equation 1, $x_1$ may denote an x value of the point, which is the calculation result of k×G, mod may denote modular arithmetic, n may denote an upper order of an EC, k may denote the generated random value, H(m) may denote a hash function value for a message m, and sk may denote a private key.

As described above, in order to generate the digital signature pair (r,s), the electronic device 100 may use a result obtained by performing the scalar point multiplication. The electronic device 100 may calculate a second intermediate result l and perform scalar point multiplication using the first intermediate result 112 ($t^{-1} \times G$) and the second intermediate result l in operations S230 and S240. For example, the second intermediate result l may be determined to be k·t mod n. For example, 1×($t^{-1} \times G$) may be calculated as k×G.

For example, the electronic device 100 may calculate the second intermediate result l using the secret information 111 ($t$) and the random value k in operation S230. For example, the electronic device 100 may calculate the second intermediate result l as shown in Equation 2 below.

$$l = k \cdot t \bmod n \quad \text{[Equation 2]}$$

In Equation 2, mod may denote modular arithmetic, and n may denote an upper order of an EC.

For example, the electronic device 100 may perform scalar point multiplication using the first intermediate result 112 ($t^{-1} \times G$) and the second intermediate result l in operation S240. For example, the electronic device 100 may perform the scalar point multiplication using the first intermediate result 112 ($t^{-1} \times G$) and the second intermediate result l. The electronic device 100 may calculate 1×($t^{-1} \times G$) and perform a calculation on points of 1×($t^{-1} \times G$).

As an example, when the electronic device 100 generates a private key or calculates a public key from the private key, the electronic device 100 may use the stored first intermediate result 112 to prevent a side-channel attack.

For example, a predetermined private key sk may be stored in a memory 110 and/or a chip. The electronic device 100 may read the private key sk stored in the memory 110.

For example, the electronic device 100 may calculate a second intermediate result l. The electronic device 100 may calculate the second intermediate result l using the secret information 111 ($t$) and the private key sk. For example, the second intermediate result l may be determined to be sk·t mod n. n may denote an upper order of an EC, and mod may denote modular arithmetic.

For example, a public key Pk may be determined to be sk×G. The electronic device 100 may perform scalar point multiplication to calculate sk×G using the first intermediate result 112 ($t^{-1} \times G$) and the second intermediate result l. For example, the electronic device 100 may calculate 1×($t^{-1} \times G$). As described above, the electronic device 100 may perform the scalar point multiplication using the predetermined private key sk and the first intermediate result 112.

As described above, the electronic device 100 may perform a calculation to obtain the public key Pk using the first intermediate result 112 and the second intermediate result. The electronic device 100 may prevent a side-channel attack in the process of generating the private key sk or calculating the public key Pk from the private key sk.

When the electronic device 100 performs a cryptographic calculation using the secret information 111 ($t$) and the first intermediate result 112, information that can be obtained through a side-channel attack is the first intermediate result 112 and the second intermediate result. Even when the first intermediate result 112 ($t^{-1} \times G$) and/or the second intermediate result k·t mod n is known, the random value k, which is a target of the attack, cannot be known, and thus the purpose of the side-channel attack cannot be achieved.

As an example, the electronic device 100 may not use the secret information 111 ($t$) and/or the first intermediate result 112 during ECDSA signature verification or a calculation using a private key that can be known from the outside. When the electronic device 100 uses the secret information 111 ($t$) and/or the first intermediate result 112 during the ECDSA signature verification or the calculation using the private key that can be known from the outside, the secret information 111 ($t$) may be exposed.

For example, a function that can be used as a substitute for an ECDSA calculator may be provided externally, a temporary private key may be input to the electronic device 100, and when the electronic device 100 provides a function of generating an ECDSA signature with the temporary private key or a function of inputting the temporary private key from the outside and outputting a public key thereof, the electronic device 100 may not use the secret information 111 (*t*) and/or the first intermediate result 112 during a cryptographic calculation.

Figure 3:
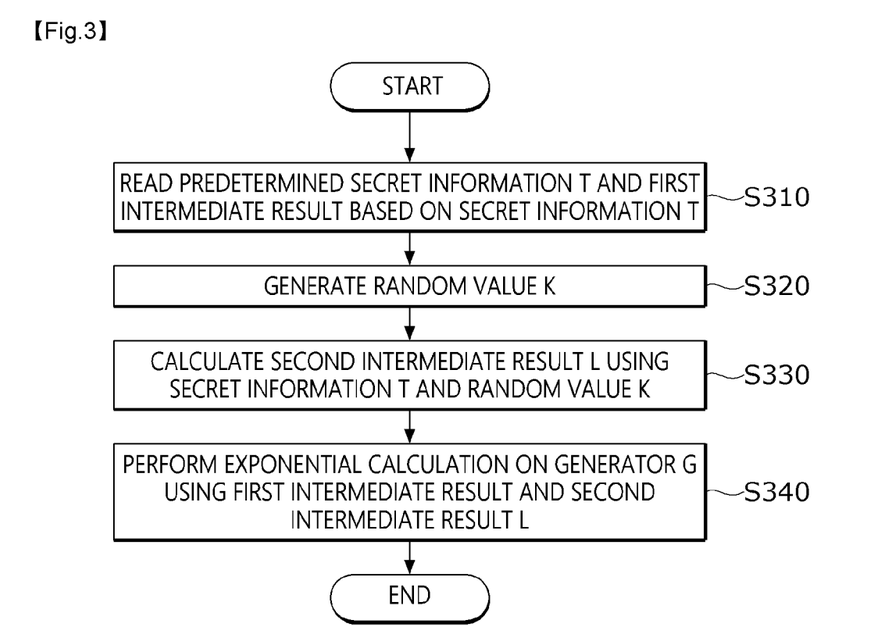
FIG. 3 is an operation flowchart of a method of calculating a cipher according to an embodiment.

FIG. 3 is an operation flowchart of a method of calculating a cipher according to an embodiment.

As an example, an electronic device 100 may read predetermined secret information 111 and a first intermediate result 112 based on the secret information 111 in operation S310. For example, the electronic device 100 may read secret information 111 and a first intermediate result 112 stored in a memory 110 and/or a chip.

For example, the electronic device 100 may generate a random value in operation S320. The random value is a value that is not exposed to the outside like the secret information 111, and may be generated whenever a digital signature is generated.

For example, the electronic device 100 may calculate a second intermediate result using the secret information 111 and the random value in operation S330. The electronic device 100 may perform an exponential calculation on a generator g using the first intermediate result 112 and the second intermediate result in operation S340.

For example, the electronic device 100 may perform a cryptographic calculation according to a PM cryptographic algorithm based on a DLP.

For example, the electronic device 100 may read the first intermediate result 112 based on secret information 111 (*t*). For example, the first intermediate result 112 may be determined to be $$g^{t^{-1}}.$$

For example, g may denote the generator.

For example, the electronic device 100 may calculate a second intermediate result l using the secret information 111 (*t*) and a random value k. For example, the electronic device 100 may calculate the second intermediate result l as shown in Equation 3 below. In Equation 3 below, n denotes the order.

$$l = k \cdot t \bmod n \quad \text{[Equation 3]}$$

For example, the electronic device 100 may perform an exponential calculation on the generator g using the first intermediate result 112

$$g^{t^{-1}}$$

and the second intermediate result l. For example, the electronic device 100 may perform an exponential calculation on the generator g as shown in Equation 4 below. mod may denote modular arithmetic.

$$g^k = \left(g^{t^{-1}}\right)^l = g^{t^{-1} k \cdot t} \quad \text{[Equation 4]}$$

As an example, the electronic device 100 may store a private key sk in the memory 110 and/or the chip. For example, a public key pk may be calculated using the private key sk and the generator g. For example, the public key pk may be determined to be $g^{sk}$.

The electronic device 100 may calculate the second intermediate result l using the private key sk and the secret information 111 (*t*). For example, sk·t mod n may be calculated as the second intermediate result l.

The electronic device 100 may calculate the public key pk using the first intermediate result 112

$$g^{t^{-1}}$$

and the second intermediate result sk·t mod n. For example, the electronic device 100 may calculate the public key pk as shown in Equation 5 below.

$$pk = g^{sk} = \left(g^{t^{-1}}\right)^{sk \cdot t} \quad \text{[Equation 5]}$$

As described above, the electronic device 100 may perform an exponential calculation using the first intermediate result 112 and the second intermediate result and prevent a side-channel attack in the process of generating the DLP-based private key sk or calculating the public key pk from the private key sk.

As an example, the electronic device 100 may use the secret information and the first intermediate result to perform a calculation in which mod p is used in GF(p). For example, the electronic device 100 may use the secret information and the first intermediate result to perform a cryptographic calculation in a method of calculating a cipher, in which DH key exchange calculated in mod p, a DSA, or the like using the generator g is used.

For example, the electronic device 100 may read secret information t and a first intermediate result $$g^{t^{-1}} \bmod p$$

(here, p is a prime number) based on the secret information t. The electronic device 100 may generate a random value k. The electronic device 100 may calculate a second intermediate result l=k·t mod n (here, n is the order) using the secret information t and the random value k. The electronic device 100 may calculate $g^k$ mod p using the first intermediate result $$g^{t^{-1}} \bmod p$$

and the second intermediate result l as shown in Equation 6 below.

$$g^k \bmod p = \left(g^{t^{-1}}\right)^l \bmod p = \left(g^{t^{-1}}\right)^{k \cdot t} \bmod p \quad \text{[Equation 6]}$$

As described above, the electronic device 100 may perform a cryptographic calculation using the secret information and the first intermediate result based on the secret information even in a DLP-based cryptographic calculation method for DH key exchange. In the cryptographic calculation for the DH key exchange, the electronic device 100 may use the first intermediate result and the second intermediate result to calculate $g^k$ mod p for exchange in the calculation of mod p.

As an example, in the cryptographic calculation using the private key sk that can be known from the outside or in DSA signature verification, the electronic device 100 may not use the secret information 111 (t) and/or the first intermediate result 112.

In the embodiment illustrated in FIG. 2 or 3 above, the operations may be performed sequentially, but are not necessarily performed sequentially. For example, the order of the operations may be changed, or at least two operations may be performed in parallel.

For example, the electronic device 100 according to the embodiment may generate a random value k according to operation S220, and read predetermined secret information 111 and a first intermediate result 112 based on the secret information 111 according to operation S210.

For example, the electronic device 100 according to the embodiment may generate a random value k according to operation S320, and read predetermined secret information 111 and a first intermediate result 112 based on the secret information 111 according to operation S310.

Figure 4:
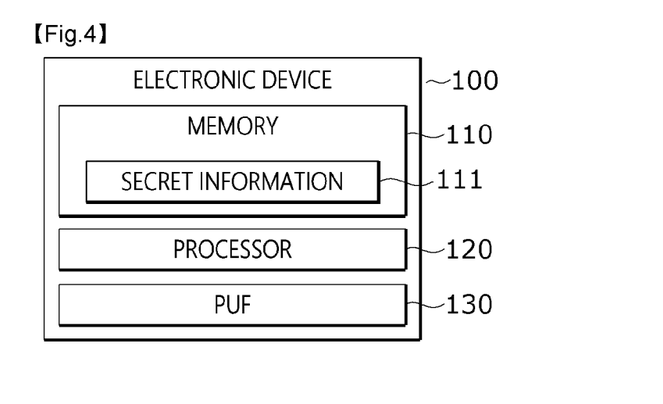
FIG. 4 is a schematic block diagram of an electronic device including a physically unclonable function (PUF) according to an embodiment.

FIG. 4 is a schematic block diagram of an electronic device 100 including a physically unclonable function (PUF) according to an embodiment.

Referring to FIG. 4, the electronic device 100 may include a memory 110, a processor 120, and PUFs 130.

The PUFs 130 may provide an unpredictable digital value. Although the respective PUFs 130 are given an accurate manufacturing process and manufactured in the same process, digital values provided by the respective PUFs 130 are different. The PUFs 130 may also be referred to as physical one-way functions (POWFs) that are practically impossible to duplicate. The non-duplicable characteristic of the PUFs 130 may be used to generate an identifier of a device for security and/or authentication. For example, the PUFs 130 may be used to provide a unique key to distinguish a device from another device.

For example, a value of the PUFs 130 may be set differently for each device and the PUFs 130 may provide an unpredictable digital value. For example, the electronic device 100 may generate the secret information 111 (t) using the PUFs 130 whenever a cryptographic calculation is performed. For example, the electronic device 100 may perform the cryptographic calculation described in FIG. 2 or 3 using the secret information 111 (t) generated using the PUFs 130.

According to various embodiments, internal secret information and intermediate results based on the secret information can be used for cryptographic calculations, and even when a side-channel attack succeeds, it is possible to fundamentally prevent the side-channel attack by preventing leakage of secret information to be known.

Meanwhile, the method according to the present invention may be written as a program that can be executed in a computer, and may be implemented in various recording media such as magnetic storage media, optical reading media, digital storage media, and the like.

Implementations of the various techniques described herein may be conducted in digital electronic circuitry, or in computer hardware, firmware, software, or combinations thereof. The implementations may be conducted as a data processing device, for example, a programmable processor and a computer, or a computer program product, that is, an information carrier, for example, a computer program tangibly embodied in a machine-readable storage device (computer-readable medium) or radio signal for processing by the operations of a plurality of computers or for controlling the operations. A computer program, such as the computer program(s) described above, may be written in any type of programming language, including compiled or interpreted languages, and may be deployed in any form, including as stand-alone programs or as modules, components, subroutines, or other units suitable for use in a computing environment. The computer program may be deployed to be processed on one computer or multiple computers at one site or distributed across multiple sites and interconnected by a communication network.

Examples of processors suitable for processing a computer program include both general and special purpose microprocessors, and any one or more processors of any type of digital computer. Generally, a processor may receive instructions and data from a read only memory, a random access memory, or both the read only memory and the random access memory. Elements of a computer may include one or more processors that execute instructions, and one or more memory devices that store instructions and data. Generally, a computer may include one or more mass storage devices that store data, such as magnetic disks, magneto-optical disks, or optical disks, or may receive data from the mass storage devices, transmit data to the mass storage devices, or receive and transmit the data from and to the mass storage devices. Examples of information carriers suitable for embodying computer program instructions and data include semiconductor memory devices, for example, magnetic media such as hard disks, floppy disks, and magnetic tapes, optical media such as compact disc read only memories (CD-ROMs) and digital video discs (DVDs), magneto-optical media such as floptical disks, read only memories (ROMs), random access memories (RAMs), flash memories, erasable programmable ROMs (EPROMs), electrically erasable programmable ROMs (EEPROMs), and the like. The processor and the memory may be supplemented by, or included in, special purpose logic circuitry.

In addition, the computer-readable medium may be any available medium that can be accessed by a computer, and may include both a computer storage medium and a transmission medium.

While this specification includes details of a plurality of specific implementations, these should not be understood as limitations of any invention or the scope to be claimed, but should be understood as descriptions of features that can be specific to specific embodiments of the specific invention. Specific features described herein may also be implemented by being combined in a single embodiment in the context of the individual embodiment. On the other hand, various features described in the context of a single embodiment may be implemented individually or in appropriate sub-combinations in a plurality of embodiments. While features operate as specific combinations and are described and claimed initially as such, at least one feature may be excluded from claimed combinations in some cases, and the claimed combinations may be changed to sub-combinations or modifications of the sub-combinations.

Further, while the accompanying drawings illustrate operations in a particular order, this does not mean that these operations should be performed in the illustrated specific order or sequence or that all illustrated operations should be performed in order to obtain a desired result. In a particular case, multi-tasking and parallel processing may be advantageous. Separation of various system components in the above embodiment does not mean that such separation is required for all embodiments. In general, described program components and systems may be integrated in a single software product or may be packed in multiple software products.

Meanwhile, the embodiments disclosed in this specification and drawings are only examples to facilitate understanding of the invention, and the invention is not limited thereto. It should be apparent to those skilled in the art that various modifications can be made on the basis of the technological scope of the invention in addition to the embodiments disclosed herein.

What is claimed is:

1. A method of calculating a cipher of an electronic device, the method being implemented by a processor of the electronic device in cooperation with a physically unclonable function (PUF) circuit and a secure memory in the electronic device, the method comprising:
reading predetermined secret information (t) and a first intermediate result based on the predetermined secret information (t), wherein t is a unique and unpredictable digital value generated by the PUF circuit of the electronic device and stored only in the secure memory and wherein the first intermediate result is ($t^{-1}$×G) calculated using a generator point G of an elliptic curve domain parameter set, and G is a predefined public base point of order n on an elliptic curve (EC);
generating a random value (k), wherein k is generated for each cipher calculation;
calculating a second intermediate result (l) as (k×t) mod n using the predetermined secret information (t) and the random value (k), wherein n is the order of the generator point G, and the mod is a modular arithmetic performed by the processor in hardware; and
performing scalar point multiplication using the first intermediate result and the second intermediate result (l), thereby calculating the cipher,
wherein the first intermediate result is determined at a different time point from the calculating of the second intermediate result (l) and the second intermediate result (l) is stored in a chip and/or memory included in the electronic device,
wherein the first intermediate result is determined to be ($t^{-1}$×G) calculated using a calculation in which the predetermined secret information (t) and a generator (G) are used.

2. The method of claim 1, wherein, in the calculating of the second intermediate result l, in order to calculate k×G, k*t mod n is calculated using the predetermined secret information (t), the random value (k), and an upper order n of the elliptic curve (EC) as the second intermediate result (l), and
the mod denotes the modular arithmetic.

3. The method of claim 1, wherein, in the performing of the scalar point multiplication, k×G=l×($t^{-1}$×G) is calculated using the second intermediate result (l) and the first intermediate result ($t^{-1}$×G).

4. The method of claim 1, wherein the predetermined secret information (t) includes a value of a physically unclonable function (PUF) that provides a digital value that is set differently for each device and is unpredictable.

5. The method of claim 1, further comprising reading a predetermined private key sk
wherein, in the calculating of the second intermediate result (l), in order to calculate a public key (Pk) Pk=sk×G, for the private key sk, sk*t mod n is calculated using the private key sk, the predetermined secret information (t), and an upper order n of the EC as the second intermediate result (l), in the performing of the scalar point multiplication, Pk=l×($t^{-1}$×G) is calculated using the first intermediate result ($t^{-1}$×G) and the second intermediate result (l), and
the mod denotes the modular arithmetic.

6. A method of calculating a cipher of an electronic device, the method being implemented by a processor of the electronic device in cooperation with a physically unclonable function (PUF) circuit and a secure memory in the electronic device, the method comprising:
reading predetermined secret information (t) and a first intermediate result based on the predetermined secret information (t), wherein t is a unique and unpredictable digital value generated by the PUF circuit of the electronic device and stored only in the secure memory and wherein the first intermediate result is ($t^{-1}$×G) calculated using a generator point G of an elliptic curve domain parameter set, and G is a predefined public base point of order n on an elliptic curve;
generating a random value (k), wherein k is generated for each cipher calculation;
calculating a second intermediate result (l) as (k×t) mod n using the predetermined secret information (t) and the random value (k), wherein n is the order of the generator point G, and the mod is a modular arithmetic performed by the processor in hardware; and
performing an exponential calculation on a generator g using the first intermediate result and the second intermediate result (l), thereby calculating the cipher,
wherein the first intermediate result is determined at a different time point from the calculating of the second intermediate result (l) and the second intermediate result (l) is stored in a chip and/or memory included in the electronic device,
wherein the first intermediate result is determined to be $g^{t^{-1}}$ calculated using a calculation in which the predetermined secret information (t) and the generator g are used,
in the calculating of the second intermediate result (l), in order to calculate $g^k$, k*t mod n is calculated using the predetermined secret information (t) and the random value (k) as the second intermediate result (l), and
in the performing of the exponential calculation, $g^k = (g^{t^{-1}})^l$ is calculated using the first intermediate result and the second intermediate result (l).

7. The method of claim 6, further comprising reading a predetermined private key sk,
wherein, in the calculating of the second intermediate result (l), in order to calculate pk=$g^{sk}$ for the private key sk, sk*t mod n is calculated using the predetermined secret information (t) as the second intermediate result (l),
in the performing of the exponential calculation, $$g^{sk} = \left(g^{t^{-1}}\right)^l$$

is calculated using the first intermediate result and the second intermediate result (l), and
the mod denotes the modular arithmetic.

8. The method of claim 6, wherein the first intermediate result is determined to be $$g^{t^{-1}} \bmod p$$

is calculated using a calculation in which the predetermined secret information (t), the generator g, and a prime number p are used, in the calculating of the second intermediate result (l), in order to calculate $g^k$ mod p, k*t mod n is calculated using the predetermined secret information (t) and the random value k as the second intermediate result (l), and in the performing of the exponential calculation, $$g^k \bmod p = \left(g^{t^{-1}}\right)^l \bmod p = \left(g^{t^{-1}}\right)^{k \cdot t}$$

mode p is calculated using the first intermediate result and the second intermediate result (l).

9. An electronic device comprising:

a processor; and a memory electrically connected to the processor and configured to store instructions executable by the processor, wherein the processor is configured to read predetermined secret information (t) and a first intermediate result based on the predetermined secret information (t), wherein t is a unique and unpredictable digital value generated by the PUF circuit of the electronic device and stored only in the secure memory and wherein the first intermediate result is ($t^{-1} \times G$) calculated using a generator point G of an elliptic curve domain parameter set, and G is a predefined public base point of order n on an elliptic curve, generate a random value k, wherein k is generated for each cipher calculation, calculate a second intermediate result (l) as (k×t) mod n using the predetermined secret information (t) and the random value (k), wherein n is the order of the generator point G, and the mod is a modular arithmetic performed by the processor in hardware, and perform an exponential calculation on a generator g using the first intermediate result and the second intermediate result (l), and the first intermediate result is determined at a different time point from the calculation of the second intermediate result (l) and the second intermediate result (l) is stored in a chip and/or memory included in the electronic device, wherein the first intermediate result is determined to be $g^{t^{-1}}$ calculated using a calculation in which the predetermined secret information (t) and the generator g are used, and the processor is configured to calculate k×t mod n as the second intermediate result (l) using the predetermined secret information (t) and the random value (k) in order to calculate gk, and calculate gk=$(g^{t^{-1}})^l$ using the first intermediate result and the second intermediate result (l).

10. The electronic device of claim 9, wherein the processor is configured to:

read a predetermined private key sk;

calculate sk*t mod n using the predetermined secret information (t) as the second intermediate result (l) in order to calculate pk=$g^{sk}$ for the private key sk; and calculate $$g^{sk} = \left(g^{t^{-1}}\right)^l$$

using the first result and the second intermediate result (l), and the mod denotes the modular arithmetic.

11. The electronic device of claim 9, wherein the first intermediate result is determined to be $g^{t^{-1}}$ mod p calculated using a calculation in which the predetermined secret information (t), the generator g, and a prime number p are used, and the processor is configured to calculate k*t mod n as the second intermediate result (l) using the predetermined secret information (t) and the random value in order to calculate $g^k$ mod p, and calculate $$g^k \bmod p = \left(g^{t^{-1}}\right)^l \bmod p = \left(g^{t^{-1}}\right)^{k \cdot t}$$

mode p using the first intermediate result and the second intermediate result (l).

12. The electronic device of claim 9, wherein the processor is configured to perform scalar point multiplication using the first intermediate result and the second intermediate result (l).

13. The electronic device of claim 12, wherein the processor is configured to calculate, in order to calculate k×G, k*t mod n using the predetermined secret information (t), the random value (k), and an upper order n of the elliptic curve (EC) in the calculating of the second intermediate result (l), and the mod denotes the modular arithmetic.

14. The electronic device of claim 12, wherein the processor is configured to calculate k×G=l×($t^{-1} \times G$) is calculated using the second intermediate result (l) and the first intermediate result ($t^{-1} \times G$) in the performing of the scalar point multiplication.

15. The electronic device of claim 12, wherein the processor is configured to read a predetermined private key sk, in order to calculate Pk=sk×G for the private key sk, calculate the second intermediate result (l) as sk*t mod n using the private key sk, the predetermined secret information and an upper order n of an EC in the calculating of the second intermediate result (l).

16. The electronic device of claim 15, wherein the processor is configured to calculate Pk=l×($t^{-1} \times G$) by using the first intermediate result ($t^{-1} \times G$) and the second intermediate result (l) in the performing of the scalar point multiplication, and wherein the mod denotes the modular arithmetic.

17. The electronic device of claim 9, wherein the predetermined secret information includes a value of a physically unclonable function (PUF) that provides a digital value that is set differently for each device and is unpredictable.

* * * * *